United States Patent
Nicholson et al.

(10) Patent No.: US 12,230,260 B2
(45) Date of Patent: Feb. 18, 2025

(54) ANONYMIZATION OF TEXT TRANSCRIPTS CORRESPONDING TO USER COMMANDS

(71) Applicant: Lenovo (Singapore) Pte. Ltd., Singapore (SG)

(72) Inventors: John Weldon Nicholson, Cary, NC (US); Igor Stolbikov, Apex, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 17/193,462

(22) Filed: Mar. 5, 2021

(65) Prior Publication Data
US 2022/0284892 A1   Sep. 8, 2022

(51) Int. Cl.
| | |
|---|---|
| *G10L 15/22* | (2006.01) |
| *G06F 21/62* | (2013.01) |
| *G06F 40/279* | (2020.01) |
| *G10L 15/26* | (2006.01) |
| *H04L 9/06* | (2006.01) |

(52) U.S. Cl.
CPC .......... *G10L 15/22* (2013.01); *G06F 21/6254* (2013.01); *G06F 40/279* (2020.01); *G10L 15/26* (2013.01); *H04L 9/0643* (2013.01); *G10L 2015/223* (2013.01)

(58) Field of Classification Search
CPC ............. G10L 15/229; G10L 2015/223; G06F 40/279; H04L 9/0643
See application file for complete search history.

(56) References Cited

U.S. PATENT DOCUMENTS

| | | | | |
|---|---|---|---|---|
| 9,002,696 B2* | 4/2015 | Kraenzel | ................ | G06F 40/51 |
| | | | | 704/277 |
| 9,536,067 B1* | 1/2017 | Lee | ......................... | G06F 21/31 |
| 9,852,311 B1* | 12/2017 | Kothari | ................ | G06F 21/606 |
| 11,138,334 B1* | 10/2021 | Garrod | .................... | G10L 15/02 |
| 2013/0191122 A1* | 7/2013 | Mason | .................. | G06F 16/632 |
| | | | | 704/231 |
| 2016/0188714 A1* | 6/2016 | Bradley | ................ | G06F 16/955 |
| | | | | 707/736 |
| 2016/0196554 A1* | 7/2016 | Yin | ..................... | G06Q 20/3827 |
| | | | | 705/44 |
| 2016/0270025 A1* | 9/2016 | Osann, Jr. | ................ | H04W 4/40 |
| 2017/0039487 A1* | 2/2017 | Naganuma | .......... | G06F 21/6254 |

(Continued)

FOREIGN PATENT DOCUMENTS

WO   WO-2018117376 A1 *   6/2018   ............. G06F 21/32

*Primary Examiner* — Paras D Shah
*Assistant Examiner* — Oluwadamilola M Ogunbiyi
(74) *Attorney, Agent, or Firm* — FERENCE & ASSOCIATES LLC

(57) ABSTRACT

One embodiment provides a method, including: receiving, at an information handling device, text associated with a user command; storing, in a data store, an encrypted form of the text associated with the user command; determining, using a processor, whether the encrypted form of the text has been detected in other user commands in exceedance of a predetermined threshold; and storing, responsive to determining that the encrypted form of the text has been detected in the other user commands in exceedance of the predetermined threshold, an unencrypted transcript of the text in a data table. Other aspects are described and claimed.

17 Claims, 5 Drawing Sheets

(56) References Cited

U.S. PATENT DOCUMENTS

| | | | |
|---|---|---|---|
| 2017/0200003 A1* | 7/2017 | Zaver | H04L 9/0656 |
| 2018/0278745 A1* | 9/2018 | Flores | H04W 12/02 |
| 2018/0321905 A1* | 11/2018 | Fountaine | G06F 3/165 |
| 2018/0364975 A1* | 12/2018 | Kwong | G06F 3/167 |
| 2019/0088251 A1* | 3/2019 | Mun | G10L 15/083 |
| 2019/0109869 A1* | 4/2019 | Bailey | H04L 63/1425 |
| 2019/0245688 A1* | 8/2019 | Patin | H04L 9/321 |
| 2019/0268144 A1* | 8/2019 | Hirota | H04L 9/0891 |
| 2019/0273733 A1* | 9/2019 | Kawabata | G06F 21/31 |
| 2019/0341038 A1* | 11/2019 | Bromand | G06F 3/167 |
| 2019/0361719 A1* | 11/2019 | Vangala | G06F 16/24578 |
| 2019/0391541 A1* | 12/2019 | Uppala | G10L 15/22 |
| 2019/0391788 A1* | 12/2019 | Blake | G06F 16/683 |
| 2020/0135334 A1* | 4/2020 | Rajasekhar | G08B 25/016 |
| 2020/0192921 A1* | 6/2020 | Satterfield | G06F 16/3323 |
| 2020/0210593 A1* | 7/2020 | Goldberg | H04L 67/306 |
| 2021/0057002 A1* | 2/2021 | Chen | H04L 9/3242 |
| 2021/0176221 A1* | 6/2021 | Li | H04L 63/0457 |
| 2021/0226801 A1* | 7/2021 | Kojima | H04L 9/0643 |
| 2021/0360002 A1* | 11/2021 | Metel | H04L 9/006 |
| 2021/0409380 A1* | 12/2021 | Krishnamoorthy | H04L 63/0428 |

* cited by examiner

| Hash | Transcript | Count | Last Observed |
|---|---|---|---|
| 840d96... | "set brightness to max" | 1758 | 2020-09-09Z... |
| 20d107... | "increase brightness" | 1653 | 2020-09-08Z... |
| 03d343... | "set brightness 100" | 1025 | 2020-09-10Z... |
| 4aac6c... | | 637 | 2020-08-31Z... |
| 75ce68... | | 45 | 2020-08-17Z... |

FIG. 4

| Hash | Transcript | Normalized | Alternates | Count | Last Observed |
|---|---|---|---|---|---|
| 840d96... | "set brightness to max" | Set Bright 100 | • "set *highness* to max"<br>• "set *height less* to max"<br>• "set *high net* to max" | 1758 | 2020-09-09Z... |
| 03d343... | | Set Bright 100 | | 875 | 2020-09-10Z... |

FIG. 5

ANONYMIZATION OF TEXT TRANSCRIPTS CORRESPONDING TO USER COMMANDS

BACKGROUND

Information handling devices ("devices"), for example smart phones, tablet devices, smart speakers, laptop and personal computers, and the like, may be capable of receiving and processing inputs from a user. For example, a user may interact with a voice input module (e.g., embodied in a digital assistant) through use of natural language. This style of interface allows a device to receive voice inputs from the user (e.g., queries, commands, etc.), process those inputs, and thereafter perform one or more downstream functions as dictated by the voice input.

BRIEF SUMMARY

In summary, one aspect provides a method, including: receiving, at an information handling device, text associated with a user command; storing, in a data store, an encrypted form of the text associated with the user command; determining, using a processor, whether the encrypted form of the text has been detected in other user commands in exceedance of a predetermined threshold; and storing, responsive to determining that the encrypted form of the text has been detected in the other user commands in exceedance of the predetermined threshold, an unencrypted transcript of the text in a data table.

Another aspect provides an information handling device, including: a sensor; a processor; a memory device that stores instructions executable by the processor to: receive text associated with a user command; store, a data store, an encrypted form of the text associated with the user command; determine, using a processor, whether the encrypted form of the text has been detected in other user commands in exceedance of a predetermined threshold; and store, responsive to determining that the encrypted form of the text has been detected in the other user commands in exceedance of the predetermined threshold, an unencrypted transcript of the text in the data table.

A further aspect provides a product, including: a storage device that stores code, the code being executable by a processor and comprising: code that receives text associated with a user command; code that stores an encrypted form of the text associated with the user command in a data store; code that determines whether the encrypted form of the text has been detected in other user commands in exceedance of a predetermined threshold; and code that displays, responsive to determining that the encrypted form of the raw text has been detected in the other user commands in exceedance of the predetermined threshold, an unencrypted transcript of the text in the data table.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 illustrates an anonymized data table according to an embodiment.

FIG. 5 illustrates an anonymized data table according to an embodiment.

DETAILED DESCRIPTION

Figure 1:
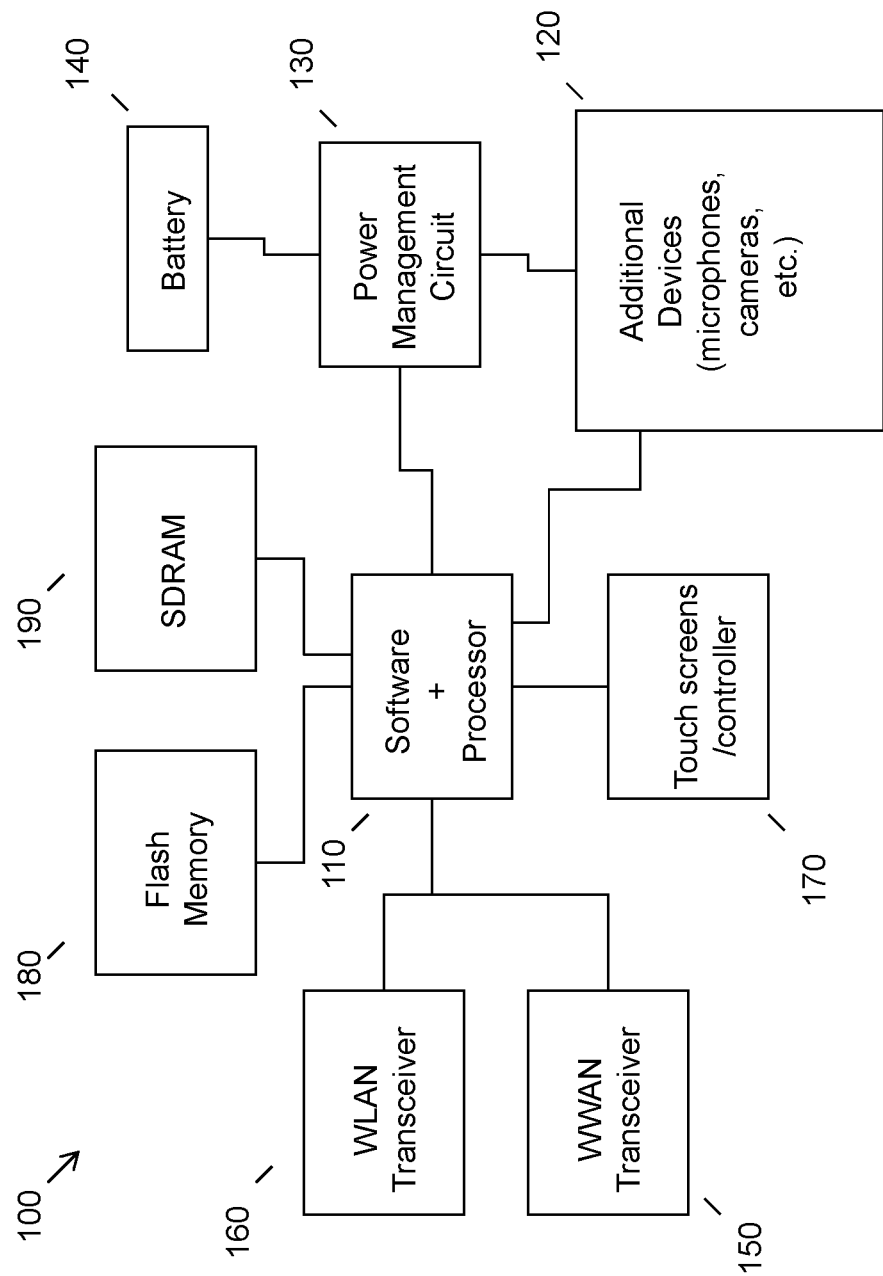
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As with virtually any computing environment, issues may arise in speech recognition systems that need to be identified and fixed. More particularly, these systems need to be continually monitored and updated to keep pace with the rapidly evolving nature of language (e.g., as new words or phrases are added to the general lexicon, as new pronunciations or utilizations develop for certain words, etc.). If not maintained, speech recognition systems may be unable to effectively recognize and process audible user commands.

One of the best ways to improve the natural language recognition and processing capabilities of a digital assistant capable of speech recognition is to access and analyze the raw commands provided by the global population of users (e.g., to identify where and/or how the system is failing, to identify aspects of the system individuals use most frequently, etc.). However, access to these commands may lead to issues with respect to user privacy. More particularly, user command inputs may contain virtually anything, including personally identifiable information ("PII"). This may be especially true in situations where a digital assistant incorrectly assumes that a command has been provided and attempts to process the users' utterance.

No solutions currently exist that balance the privacy considerations of the users while still preserving the need to continually improve the speech recognition system associated with the digital assistant. At best, some systems contain "opt-out" options where a user can choose to not have any of their information collected and stored. In these situations, any improvements made to the processing capabilities of the system are facilitated by the interaction data obtained from the remaining population of users that do not opt out. This solution effectively decreases the overall pool of users, thereby hampering the system's ability to efficiently improve. Additionally, the users that have agreed to have their interaction data stored are still not effectively protected from having certain types of PII inadvertently captured.

Accordingly, an embodiment provides a method for anonymizing the raw input text of commands, thereby enabling technicians to access this data without correlating it to any one specific individual. In an embodiment, a user command may be detected at a device. The command may be analyzed and an encrypted form of the text (e.g., the raw text, a normalized version of the text, an alternate version of the text, etc.) associated with the user command may be stored in a data store (e.g., a data table, another storage database, etc.). Responsive to determining that the same text has been detected a predetermined number of times in other commands provided by the user or a multitude of different users, an embodiment may thereafter display an unencrypted transcript of the text in a data table. Such a process dramatically reduces the risk of a speech recognition system capturing and storing PII because any raw text that has been made visible has been provided by multiple users.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
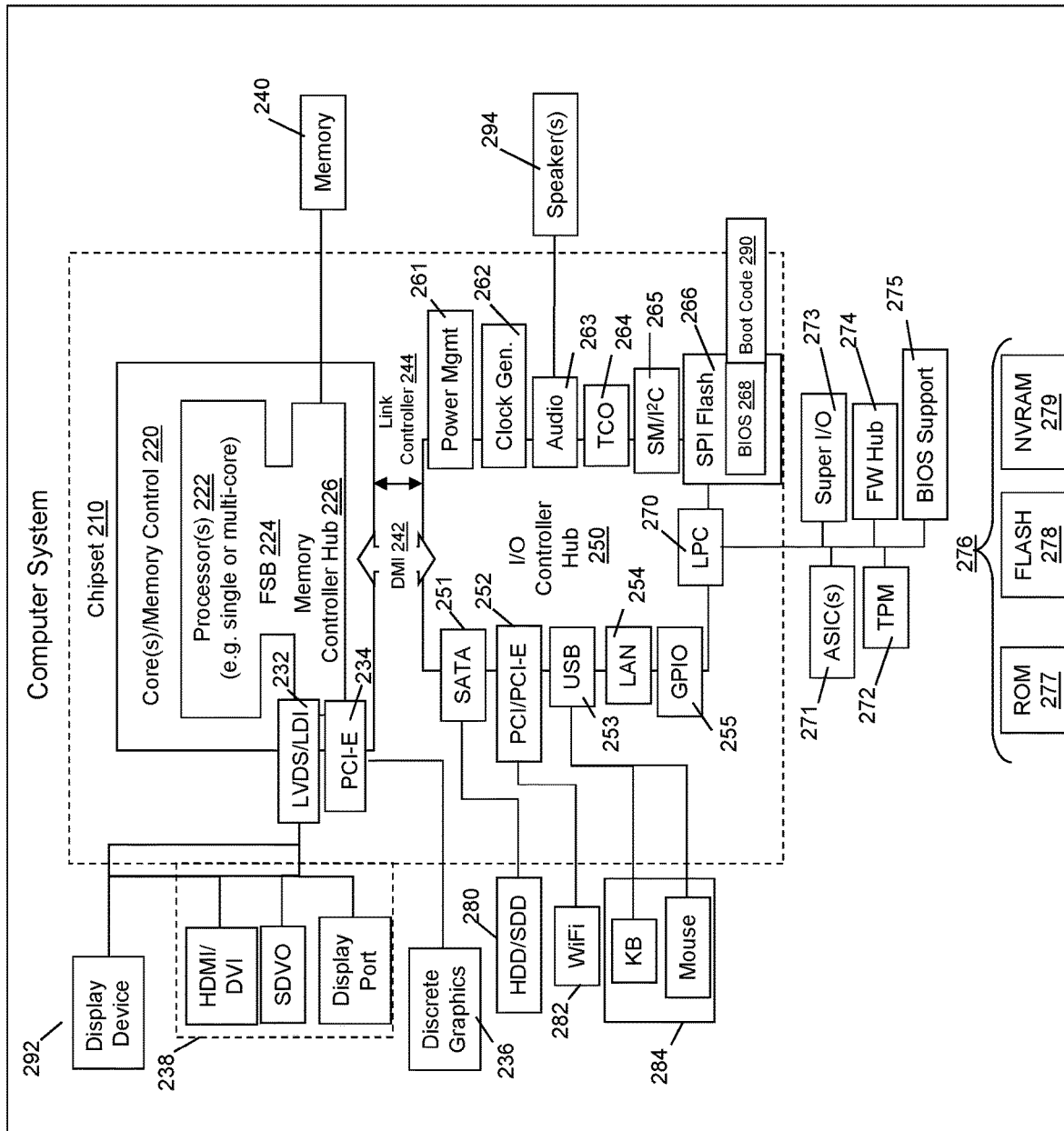
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving commands from a user and identifying a text correlation from those commands. For example, the circuitry outlined in FIG. 1 may be implemented in a smart phone or tablet embodiment, whereas the circuitry outlined in FIG. 2 may be implemented in a laptop computer.

Figure 3:
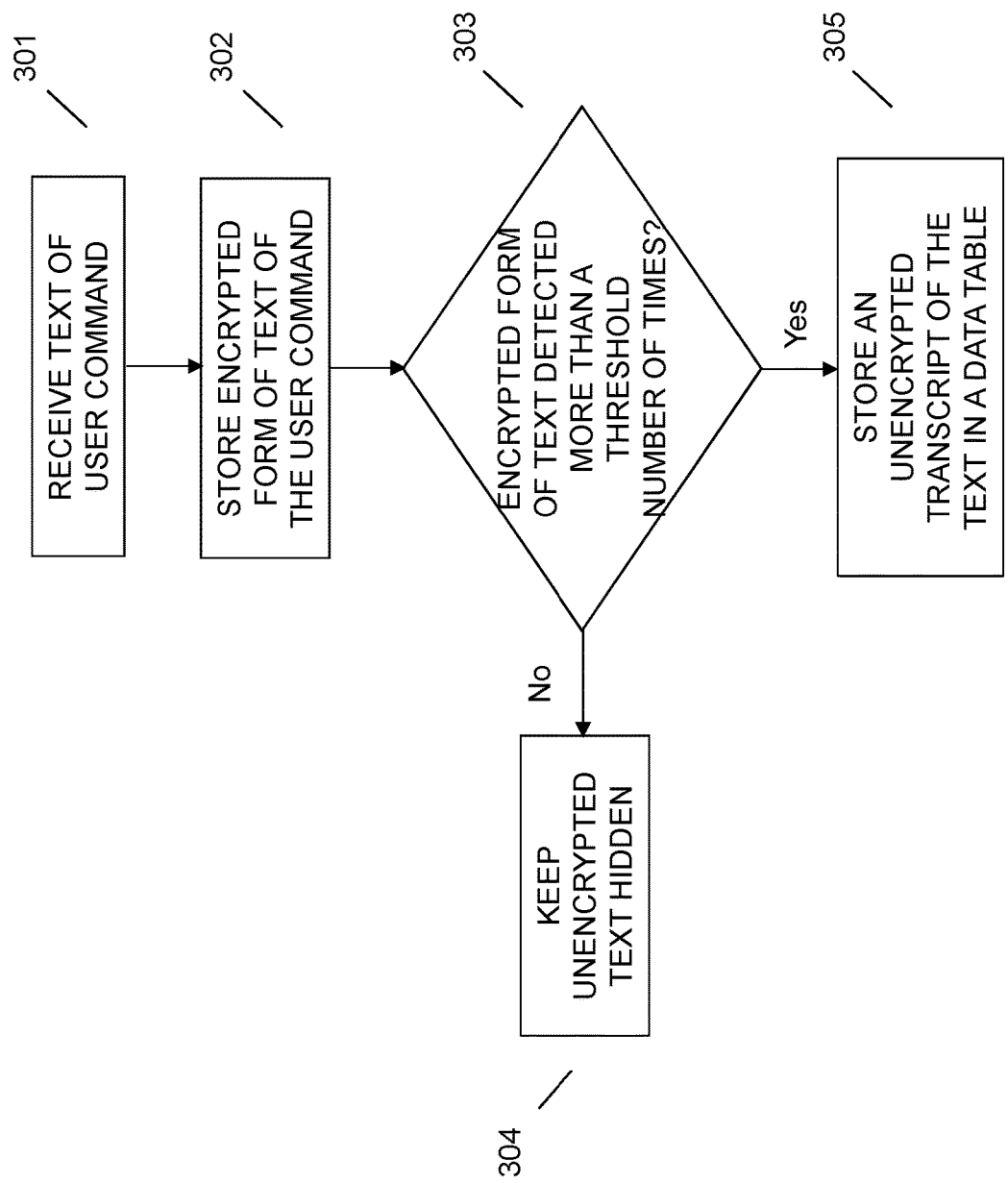
FIG. 3 illustrates an example method of anonymizing user command transcripts.

Referring now to FIG. 3, a method for ensuring the anonymity of user commands is provided. At 301, an embodiment may receive the text associated with the user command. In an embodiment, the user command may be provided by a variety of different input modalities (e.g., audible input, typing input, touching input, handwriting input, etc.) and may be detected using one or more different input detecting means (e.g., a microphone for audible input, a keyboard for typing input, a touch sensitive display for touch and/or handwriting input, etc.). For simplicity purposes, the remainder of this discussion is directed to user voice commands detected by an audio input device (e.g., a microphone, etc.) integrally or operatively coupled to a user's device In an embodiment, the text associated with the user command may correspond to one of: the raw text of the user command, a normalized version of the raw text, and at least one alternate version of the raw text. In an embodiment, the raw text corresponds to the direct text transcription of the command provided by the user, i.e., what the input recognition system interprets the command to be in text form. For example, the raw text of an audible user command may be the text transcription of what a speech recognition system interprets the audible user command to be. In an embodiment, the raw text may be dynamically normalized (e.g., subject to one or more linguistic processes such as stemming, lemmatization, stop word removal, ordinal conversion, etc.) to produce a normalized version of the raw text. For example, a user command may have the raw text "Computer, set my brightness to eighty" for which a normalized version may be "Set bright 80". In an embodiment, there may a multitude of different possible text transcripts from the same speech data. Stated differently, a system may identify a multitude of alternate interpretations, or versions, of the raw text associated with the command input. For instance, using the raw text of the foregoing example, alternate versions of that raw text may include: "Computer, set my highness to eighty", "Computer, set my height less than eighty", "Computer, set height net to eighty".

In an embodiment, after the text of a user command has been received at a device, an indication of that text may be transmitted to a remote location (e.g., a cloud computing service, etc.) for additional processing. This remote processing location may therefore be capable of receiving indications of texts of user commands from a predetermined pool of users, e.g., a local pool of users corresponding to a user and their close associates (e.g., their family, work colleagues, etc.), a regional pool of users (e.g., from a user's regional geographic area, state, country, etc.), or a global pool of users.

At 302, an embodiment may encrypt the text and store it in a storage location. Although a variety of encryption techniques may be utilized, the remaining discussion is directed toward the encryption of the text as a hash value by utilization of a hashing algorithm, as conventionally known in the art. Subsequent to encryption, the encrypted text may thereafter be stored at a predetermined storage location (e.g., in a data table, another local or remote data store, etc.).

In an embodiment, each unique text associated with a user command may be assigned its own hash value. Accordingly, if the raw text strings of two user commands vary even slightly, each of those commands will receive a separate hash value. For example, User A may provide the command "mute the speakers" whereas User B may provide the command "mute the speaker". Although both of the foregoing commands effectively map to the same underlying action, each command will receive its own hash value because the raw texts of the commands are different (i.e., one is a pluralized form of the other).

In an embodiment, a hashed form of the text may not be stored in the storage location unless a recognizable action corresponding to the user command is identified. Stated differently, an embodiment may only store the text for user commands that are capable of being processed. This "check" on the system ensures that only user inputs identifiable as commands are stored in the table, thereby limiting the potential for capturing and storing PII. An embodiment may make this determination by accessing a data store of associations between user commands and associated actions.

At 303, an embodiment may determine whether the encrypted form of the text has been identified in other user commands a predetermined threshold number of times. In an embodiment, the other user commands may be provided by a single user or they may derive from a plurality of other individuals. To facilitate this determination, each hash value stored in the data table may be accompanied by a frequency counter. Such a counter may be configured to increase its value each time another iteration of the encrypted form of the text is identified. In an embodiment, the predetermined threshold value may be originally set by a programmer and later adjusted by a user of the system.

Responsive to determining, at 303, that the encrypted form of the text has not been identified at least a predetermined threshold number of times, an embodiment may, at 304, take no additional action. More particularly, an embodiment may continue to keep the transcript of the text hidden from view. Conversely, responsive to determining, at 303, that the encrypted form of the text has been identified at least the predetermined threshold number of times, an embodiment may store, at 305, an indication of an unencrypted transcript of the text in a data table.

Referring now to FIG. 4, a data table as previously mentioned is presented according to an embodiment. In an embodiment, the data table 40 may contain fields for hash values 41, raw text transcripts 42, frequency counters for each hash value 43, and dates of the last observed iteration of each raw text 44. For user commands for which the raw text has been identified at least a predetermined threshold number of times (e.g., where the threshold value utilized in FIG. 4 may be 1000), an indication of an unencrypted transcript of the raw text of the command may be stored in the data table and may be made visible to authorized personnel upon access. For example, in the data table 40, the user commands of "set brightness to max" 45, "increase brightness" 46, and "set brightness 100" 47 may be visible to an accessing user because each of those commands has a frequency count in excess of the threshold number, i.e., 1000. Conversely, the raw text for the user commands 48 and 49 remains hidden because the frequency counts for each of these commands has not yet reached 1000.

In another embodiment, additional types of content may also be made visible in the data table. For example, in addition to the raw text, a data table may be able to present a normalized version of the raw text. Accordingly, for each individual command input there may be multiple entries in the database. In this way, overseers of the speech recognition system may be able to see normalized input earlier than the raw input, i.e., because similar but different command inputs may receive their own hash value but still have the same normalized format. Additionally or alternatively, in an embodiment, there may be a multitude of different possible transcripts from the same input data. Stated differently, a system may identify a multitude of alternate interpretations of the raw text of an input command (e.g., a voice command, etc.). Accordingly, a data table may also contain a section of alternates, or "n-best", versions of the raw command text (e.g., limited to the top three alternatives, etc.).

As an example of the foregoing and with reference to FIG. 5, a data table 50 is provided according to an embodiment. In the data table 50, a threshold value to store an indication of a transcript of the raw text data may be 1000. The raw text data for a first command 51 may be "set brightness to max" and the raw text data for a second command 52 may be "increase brightness to 100". As can be seen, the raw text data for the first command 51 may be visible to an accessing user because a frequency counter associated with the first command 51 has exceeded the threshold amount whereas the raw text data for the second command 52 remains hidden (i.e., is not stored in the data table 50) because the frequency counter for the second command 52 has not exceeded the threshold amount. The provided data table 50 also contains fields for the normalized transcripts 53 as well as fields for the potential alternate transcripts 54. Focusing on the former, a data cell for each of the first command 51 and the second command 52 may be populated with a normalized transcript of the original raw text data, i.e., "Set Bright 100", regardless of whether either command has been detected the threshold amount of times. Turning to the latter, a list of potential alternative transcripts of the system's interpretation of the original input data may be provided for first command 51 but not for the second command 52 (i.e., because the raw text data has been made visible for the first command 51).

The various embodiments described herein thus represent a technical improvement to conventional methods for anonymizing the text transcripts of user commands. Using the techniques described herein, an embodiment may detect a user command using an input recognition system and store an encrypted form of the text of the user command in a storage location. An embodiment may then determine whether the encrypted form of the text of the user command has been detected by the input recognition system a predetermined number of times (e.g., via multiple provisions of the user command by a single user or one or more other individuals, etc.). If it has not, an embodiment may not store an indication of the text of the user command in a data table. If it has, an embodiment may store an unencrypted transcript of the raw text in the data table, which may be visible to a user upon access and analysis of the data table. Such a method may ensure that only the text data of user commands that have been received numerous times are stored, thereby preserving user privacy.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an input recognition system of an information handling device, text associated with a user command, wherein the text comprises an interpretation made by the input recognition system of the user command into a text transcription from an audible input provided by a user;

transmitting, responsive to the receiving, an indication of the text associated with the user command to a remote processing location, wherein the remote processing location receives indications of texts associated with user commands from a plurality of users;

encrypting, responsive to determining the user command corresponds to a recognizable action and utilizing a hashing algorithm of an encryption technique, the text associated with the user command into an encrypted form, wherein the encrypted form comprises a hash value for a raw text of the command;

storing, in a data store comprising encrypted texts received from the plurality of users, the encrypted form of the text associated with the user command, wherein the storing the encrypted form of the text comprises storing a portion of the hash value of the text comprising the recognizable action corresponding to the user command, wherein identifying the recognizable action corresponding to the user command comprises accessing a data store of associations between user commands and associated actions;

determining, using a processor and based upon information stored within the data store, whether the encrypted form of the text has been detected in other user commands received from the plurality of users in exceedance of a predetermined threshold; and storing, responsive to determining that the encrypted form of the text has been detected in the other user commands in exceedance of the predetermined threshold, an unencrypted transcript of the text in a data table visible to a user accessing the data table.

2. The method of claim 1, wherein the other user commands comprise captured commands originating from a pool of users.

3. The method of claim 1, wherein the determining comprises:
identifying a value associated with the predetermined threshold;
comparing the value against a frequency counter for the text of the user command; and
determining whether the frequency counter exceeds the value.

4. The method of claim 1, wherein the text is a raw text of the user command.

5. The method of claim 1, wherein the text is a normalized version of the user command.

6. The method of claim 1, wherein the text is at least one alternate text of the user command.

7. The method of claim 1, wherein the data table comprises a plurality of fields, wherein each of the plurality of fields is selected from the group consisting of: a hash value, a raw transcript, a normalized transcript, an alternative transcript, a frequency count, and a last observed date.

8. The method of claim 1, wherein the user command is an audible command and wherein the receiving the text comprises:
detecting, using a speech recognition system, the audible command; and
transcribing, subsequent to the detecting, the audible command.

9. An information handling device, comprising:
a sensor;
a processor;
an input recognition system;
a memory device that stores instructions executable by the processor to:
receive, at the input recognition system, text associated with a user command, wherein the text comprises an interpretation made by the input recognition system of the user command into a text transcription from an audible input provided by a user;
transmit, responsive to the receiving, an indication of the text associated with the user command to a remote processing location, wherein the remote processing location receives indications of texts associated with user commands from a plurality of users;
encrypt, responsive to determining the user command corresponds to a recognizable action and a hashing algorithm of an encryption technique, the text associated with the user command into an encrypted form, wherein the encrypted form comprises a hash value for a raw text of the command;
store, a data store comprising encrypted texts received from the plurality of users, the encrypted form of the text associated with the user command, wherein to store the encrypted form of the text comprises storing a portion of the hash value of the text comprising the recognizable action corresponding to the user command, wherein identifying the recognizable action corresponding to the user command comprises accessing a data store of associations between user commands and associated actions;
determine, using a processor and based upon information stored within the data store, whether the encrypted form of the text has been detected in other user commands received from the plurality of users in exceedance of a predetermined threshold; and
store, responsive to determining that the encrypted form of the text has been detected in the other user commands in exceedance of the predetermined threshold, an unencrypted transcript of the text in the data table visible to a user accessing the data table.

10. The information handling device of claim 9, wherein the other user commands comprise captured commands originating from a pool of users.

11. The information handling device of claim 9, wherein the instructions executable by the processor to determine comprise instructions executable by the processor to:
identify a value associated with the predetermined threshold;
compare the value against a frequency counter for the text of the user command; and
determine whether the frequency counter exceeds the value.

12. The information handling device of claim 9, wherein the text is a raw text of the user command.

13. The information handling device of claim 9, wherein the text is a normalized version of the user command.

14. The information handling device of claim 9, wherein the text is at least one alternate text of the user command.

15. The information handling device of claim 9, wherein the data table comprises a plurality of fields, wherein each of the plurality of fields is selected from the group consisting of: a hash value, a raw transcript, a normalized transcript, an alternative transcript, a frequency count, and a last observed date.

16. The information handling device of claim 9, wherein the user command is an audible command and wherein the instructions executable by the processor to receive the text comprise instructions executable by the processor to:

detect, using a speech recognition system, the audible command; and transcribe, subsequent to the detecting, the audible command.

17. A product, comprising:
a storage device that stores code, the code being executable by a processor and comprising:

code that receives, at an input recognition system, text associated with a user command, wherein the text comprises an interpretation made by the input recognition system of the user command into a text transcription from an audible input provided by a user;

code that transmits, responsive to the receiving, an indication of the text associated with the user command to a remote processing location, wherein the remote processing location receives indications of texts associated with user commands from a plurality of users;

code that encrypts, responsive to determining the user command corresponds to a recognizable action and utilizing a hashing algorithm of an encryption technique, the text associated with the user command into an encrypted form, wherein the encrypted form comprises a hash value for a raw text of the command;

code that stores, in a data store comprising encrypted texts received from the plurality of users, the encrypted form of the text associated with the user command in a data store, wherein the code that stores the encrypted form of the text comprises storing a portion of the hash value of the text comprising the recognizable action corresponding to the user command, wherein identifying the recognizable action corresponding to the user command comprises accessing a data store of associations between user commands and associated actions;

code that determines, utilizing a processor and based upon information stored within the data store, whether the encrypted form of the text has been detected in other user commands received from the plurality of users in exceedance of a predetermined threshold; and code that displays, responsive to determining that the encrypted form of the raw text has been detected in the other user commands in exceedance of the predetermined threshold, an unencrypted transcript of the text in the data table visible to a user accessing the data table.

* * * * *